United States Patent
Kobayashi (10) Patent No.: US 8,342,779 B2
(45) Date of Patent: Jan. 1, 2013

(54) CUTTING INSERT AND CUTTING METHOD (75) Inventor: Youji Kobayashi, Satsumasendai (JP)

(73) Assignee: Kyocera Corporation, Kyoto (JP)

(*) Notice: Subject to any disclaimer, the term of this patent is extended or adjusted under 35 U.S.C. 154(b) by 454 days.

(21) Appl. No.: 12/675,706

(22) PCT Filed: Aug. 29, 2008

(86) PCT No.: PCT/JP2008/065587
§ 371 (c)(1),
(2), (4) Date: Jun. 10, 2010

(87) PCT Pub. No.: WO2009/028687
PCT Pub. Date: Mar. 5, 2009

(65) Prior Publication Data
US 2010/0275749 A1    Nov. 4, 2010

(30) Foreign Application Priority Data
Aug. 31, 2007   (JP) .............................. 2007-226197

(51) Int. Cl.
*B23B 27/22*    (2006.01)
*B23C 5/20*    (2006.01)

(52) U.S. Cl. ......................................... 407/113; 407/114

(58) Field of Classification Search .................. 407/113, 407/114, 115, 116, 117, 103
See application file for complete search history.

(56) References Cited

U.S. PATENT DOCUMENTS

| | | | | |
|---|---|---|---|---|
| 5,116,167 A | * | 5/1992 | Niebauer | 407/114 |
| 5,249,894 A | * | 10/1993 | Bernadic et al. | 407/114 |
| 5,584,616 A | * | 12/1996 | Katbi et al. | 407/114 |
| 6,234,726 B1 | * | 5/2001 | Okada et al. | 407/114 |
| 7,182,555 B2 | | 2/2007 | Kitagawa et al. | 407/113 |
| 2005/0019111 A1 | | 1/2005 | Kitagawa et al. | 407/113 |

FOREIGN PATENT DOCUMENTS

| | | |
|---|---|---|
| JP | 06-190612 | 7/1994 |
| JP | 06206107 A | 7/1994 |
| JP | 09-038808 | 2/1997 |
| JP | 2002-103107 | 4/2002 |
| JP | 2002103107 A | 4/2002 |
| JP | 2003-220503 | 8/2003 |

OTHER PUBLICATIONS

Japanese language office action dated Jan. 25, 2011 and its English language translation for corresponding Japanese application 2009530219 cites the foreign patent documents above.

* cited by examiner

*Primary Examiner* — Will Fridie, Jr.
(74) *Attorney, Agent, or Firm* — DLA Piper LLP (US)

(57) ABSTRACT

In a cutting insert of the invention, a protruded portion formed on an upper surface lying more inward than a breaker groove along a corner comprises a breaker projection adjacentmost to the corner; a breaker wall face formed connectedly with the breaker projection so as to project more upward than the breaker projection; and a breaker side face formed connectedly with the breaker wall face. The breaker wall face is formed to have a smaller width toward the projecting direction of the breaker wall face, and inclined to have a higher position as it departs from the corner. The breaker side face is formed to have a larger width as it departs from the corner. The height of the breaker projection is not more than half of the height of the top of the breaker wall face, and is lower than the height of the cutting edge along the corner. A cutting method using a cutting tool comprising the cutting insert is also provided.

18 Claims, 8 Drawing Sheets

CUTTING INSERT AND CUTTING METHOD

CROSS-REFERENCE TO THE RELATED APPLICATIONS

This application is a national stage of international application No. PCT/JP2008/065587, filed on Aug. 29, 2008, and claims the benefit of priority under 35 USC 119 to Japanese Patent Application No. 2007-226197, filed on Aug. 31, 2007, the entire contents of which are incorporated herein by reference.

TECHNICAL FIELD

The present invention relates to a cutting insert used for cutting metal materials or the like over a wide range of cutting conditions, and to a cutting method.

BACKGROUND ART

Heretofore there has been cutting inserts adapted to enhance chip discharge performance by a protruded portion protruding into a breaker groove. For example, the cutting insert described in Japanese Unexamined Patent Application Publication No. 6-190612 comprises a cutting edge formed along the periphery of the upper surface, a breaker groove formed inside of the cutting edge, a middle part lying more inward than the breaker groove, and a breaker projection (a protruded portion) protruding into the breaker groove from the middle part toward a corner.

The middle part has a breaker top face having a substantially polygonal shape when viewed from above, and the side face thereof is made up of a pair of breaker side faces shaped like an inclined surface extending from a breaker bottom face to the breaker top face. The breaker projection has a substantially trapezoidal shape when viewed from side, and is formed connectedly with the middle part so that the top face thereof is lower than the breaker top face.

In the cutting insert having the above shape, the breaker projection functions as a breaker when the depth of cut is small. When the depth of cut is large, the breaker top face and the breaker side face function as a breaker. When the depth of cut is medium, the breaker projection, the breaker top face and the breaker side face respectively function as a breaker.

However, the above cutting insert has the following problems (i) and (ii).

(i) The breaker side face is divided into right and left sides by a bisector of the corner. Therefore, under conditions where the depth of cut is small (especially a range in which the depth of cut is not more than a corner R) and feed rate is large, the polygonal tip end of the breaker top face contacts with the surface of a work material, and the chip discharge direction is unstable.

(ii) There is a small level difference between the breaker top face and the breaker projection. Therefore, the chips passing through the breaker projection under the conditions where the depth of cut is small and the feed rate is large run onto the breaker top face. This leads to loss of the function as a breaker, thus discharging irregular chips.

On the other hand, the cutting insert described in Japanese Unexamined Patent Application Publication No. 9-38808 comprises at the middle part. The middle part comprises a breaker top face whose corner has a substantially circular arc shape when viewed from above. The side surface of the middle part is made up of a breaker side face formed in the shape of an inclined surface extending from a breaker bottom face toward the breaker top face.

A breaker projection protruding into a breaker groove from the middle part toward the corner has an upward projecting curved surface shape and is formed connectedly with the middle part so that the top thereof is lower than the breaker top face.

In the cutting insert thus constructed, the breaker side face lying adjacent to the corner is formed in the curved surface, and hence an improvement in terms of the above problem (i) may seem to be achieved, however unsatisfactorily. Additionally, because the level difference between the breaker top face and the breaker projection is small, the same problem as the above (ii) may occur.

DISCLOSURE OF THE INVENTION

An advantage of the invention is to provide a cutting insert having stable chip discharge performance over a wide range of cutting conditions, and a cutting method.

The cutting insert according to one embodiment of the invention comprises an upper surface comprising a corner and a first side and a second side disposed on both sides of the corner, and a lower surface corresponding to the upper surface. The cutting insert comprises a cutting edge formed continuously at least along the corner and the first side; a breaker groove formed continuously at least along the corner and the first side on the upper surface lying inside of the cutting edge; a protruded portion formed on the upper surface lying more inward than the breaker groove along the corner part; and an inclined side surface formed on the upper surface lying more inward than the breaker groove along the first side, and formed along the first side. The protruded portion comprises a breaker projection being adjacentmost to the corner; a breaker wall face lying more inward than the breaker projection and being formed connectedly with the breaker projection so as to project more upward than the breaker projection; and a breaker side face formed connectedly with the breaker wall face and formed along the first side. The breaker wall face is formed to have a smaller width toward the projecting direction of the breaker wall face, and divided into two by a bisector of the corner when viewed from above, and inclined to have a higher position as it departs from the corner in a vertical cross section with respect to the lower surface including the bisector of the corner. The breaker side face is formed to have a larger width as it departs from the corner along the first side, and formed connectedly with the inclined side surface. In the vertical cross section with respect to the lower surface including the bisector of the corner, the height of the breaker projection with respect to a reference line passing through the lowermost point of the breaker groove and being parallel to the lower surface is not more than half of the height of the top of the breaker wall face and lower than the height of the cutting edge along the corner.

The cutting tool according to an embodiment of the invention comprises a holder, and the above cutting insert attached to the tip end of the holder.

The cutting tool according to other embodiment of the invention comprises a holder, and a cutting insert attached to a tip end of the holder. The cutting insert comprises an upper surface comprising a corner and a first side and a second side disposed on both sides of the corner part; a lower surface corresponding to the upper surface; a cutting edge formed continuously at least along the corner and the first side; a breaker groove formed continuously at least along the corner and the first side on the upper surface lying inside of the cutting edge; a protruded portion formed on the upper surface lying more inward than the breaker groove along the corner; and an inclined side surface formed on the upper surface lying more inward than the breaker groove along the first side, and formed along the first side. The protruded portion comprises a breaker projection being adjacentmost to the corner part; a breaker wall face lying more inward than the breaker projection and being formed connectedly with the breaker projection so as to project more upward than the breaker projection; and a breaker side face formed connectedly with the breaker wall face and formed along the first side. The breaker wall face is formed to have a smaller width toward the projecting direction of the breaker wall face, and divided into two by a bisector of the corner when viewed from above, and inclined to have a higher position as it departs from the corner in a vertical cross section with respect to the lower surface including the bisector of the corner. The breaker side face is formed to have a larger width as it departs from the corner along the first side, and formed connectedly with the inclined side surface. In the vertical cross section with respect to the lower surface including the bisector of the corner, the height of the breaker projection with respect to a reference line passing through the lowermost point of the breaker groove and being parallel to the lower surface is not more than half of the height of the top of the breaker wall face and lower than the height of the cutting edge along the corner.

The cutting method according to one embodiment of the invention is a method of cutting a work material by using the above cutting tool, and comprises the following steps (i) to (iii): (i) the approach step of relatively bringing the cutting tool near the work material; (ii) the cutting step of cutting a surface of the work material by rotating the work material and bringing the cutting edge into contact with the surface of the work material; and (iii) the separation step of relatively separating the work material and the cutting tool.

The cutting insert and the cutting tool, as well as the cutting method, produce the effect that stable chip discharge performance is presented over a wide range of cutting conditions. That is, when the depth of cut is small during cutting, at least one of the breaker projection and the breaker wall face functions as a breaker. When the depth of cut is large, the breaker side face functions as a breaker. When the depth of cut is larger than the depth of cut within which at least one of the breaker projection and the breaker wall face functions as a breaker, and smaller than the depth of cut within which the breaker side face functions as a breaker, at least the breaker wall face functions as a breaker.

BRIEF DESCRIPTION OF THE DRAWINGS

FIG. 4(*a*) is a cross-sectional view taken along the line A-A of FIG. 3; FIG. 4(*b*) is a cross-sectional view taken along the line B-B of FIG. 3; FIG. 4(*c*) is a cross-sectional view taken along the line C-C of FIG. 3;

FIG. 5(*a*) is a cross-sectional view taken along the line D-D of FIG. 3; FIG. 5(*b*) is a cross-sectional view taken along the line E-E of FIG. 3;

FIGS. 6(*a*) to 6(*c*) are schematic explanatory drawings showing a cutting tool and a cutting method according to an embodiment of the invention;

FIG. 7 (*a*) is a plan view showing a cutting tool according to other embodiment of the invention; FIG. 7(*b*) is a side view thereof.

PREFERRED EMBODIMENTS FOR CARRYING OUT THE INVENTION

An embodiment of the cutting tool of the present invention will now be described in detail with reference to FIGS. 1 to 5. As shown in FIGS. 1 to 5, the cutting insert according to the embodiment (hereinafter referred to simply as the "insert") 1 is provided with a corner 6, an upper surface 2 having a first side and a second side arranged on both sides of the corner 6, respectively, and a lower surface 3 corresponding to the upper surface 2.

The upper surface 2 and the lower surface 3 have a substantially parallelogram outline. A through-hole 7 is formed at substantially the center of the upper surface 2. The through-hole 7 is provided for fixing the insert 1 to a holder 51 described later. The insert 1 has a 180-degree rotationally symmetrical shape with respect to the central axis of the through-hole 7. This is easy to use because when one cutting edge 4 in use is worn, the other cutting edge not yet used can be used by rotating the insert 1 180 degrees.

The cutting edge 4 is continuously formed along the first side and the second side. The cutting edge 4 is formed on an intersection part between the upper surface 2 and a side surface 8 comprising a flank face (refer to FIG. 2). A land part 9 is formed along the cutting edge 4.

A breaker groove 5 is formed on the upper surface 2 lying inside of the cutting edge 4. The breaker groove 5 is continuously formed along the corner 6 and the first side and the second side. A middle part 20 is formed on the upper surface 2 lying more inward than the breaker groove 5. A rake face 10 and a breaker bottom face 11 are formed in the breaker groove 5 in this order from the cutting edge 4 toward the middle part 20.

The middle part 20 comprises a breaker top face 21 having a substantially triangular shape when viewed from above. Both side surfaces of the middle part 20 are made up of a pair of inclined side surfaces 22 and 22 formed from the breaker bottom face 11 toward the breaker top face 21. These inclined side surfaces 22 are formed on the upper surface 2 lying more inward than the breaker groove 5 extending along the first side and the second side, and formed along the first side and the second side. These inclined side surfaces 22 are formed in the shape of a recessed curved surface, respectively.

A protruded portion 30 is formed on the upper surface 2 lying more inward than the breaker groove 5 extending along the corner 6. The protruded portion 30 is protruded into the breaker groove 5 from the middle part 20 toward the corner 6. The protruded portion 30 comprises a breaker projection 31, a breaker wall face 33, and a pair of breaker side faces 35 and 35 in this order from the corner 6 side.

The breaker projection 31 is adjacentmost to the corner 6. The breaker projection 31 is made up of two flat surfaces having an intersecting ridge thereof on a bisector L1 of the corner 6 (refer to FIG. 3). The term "the bisector L1 of the corner 6" is the bisector of the corner 6 when viewed from above.

The breaker wall face 33 is connected to the breaker projection 31. That is, the breaker wall face 33 lies more inward than the breaker projection 31, and formed connectedly with the breaker projection 31 so as to project more upward than the breaker projection 31.

The breaker wall face 33 is formed to have a smaller width in the direction from a connection part 32 with the breaker projection 31 toward the middle part 20. That is, the breaker wall face 33 is formed to have a smaller width toward the projecting direction of the breaker wall face 33. Further, the breaker wall face 33 is divided into two by the bisector L1 of the corner 6 when viewed from above, and inclined to have a higher position as it departs from the corner 6 in a vertical cross section with respect to the lower surface 3 including the bisector L1 of the corner 6 (refer to FIG. 4(a)).

The breaker wall face 33 has an inclined flat surface opposed to the corner 6. In this embodiment, a line orthogonal to the inclined flat surface becomes substantially parallel to the bisector L1 of the corner 6 when viewed from above.

The pair of breaker side faces 35 and 35 are formed connectedly with both side ends of the breaker wall face 33, respectively. Specifically, the pair of breaker side faces 35 and 35 are connected with the breaker wall face 33 and formed along the first side and the second side.

More specifically, the pair of breaker side faces 35 and 35 are formed to have a larger width as they depart from the corner 6 along the first side and the second side, and formed connectedly with inclined side surfaces 22 and 22. That is, the pair of breaker side faces 35 and 35 are formed to have a larger width in the direction from a connection part 34 with the breaker wall face 33 toward the middle part 20 when viewed from above. The pair of breaker side faces 35 and 35 comprise recessed curved surfaces and are formed connectedly with the inclined side surfaces 22 and 22, respectively.

The connection part 34 between the breaker wall face 33 and the breaker side faces 35 is filleted. Consequently, chips generated smoothly run over the connection part 34.

Figure 1:
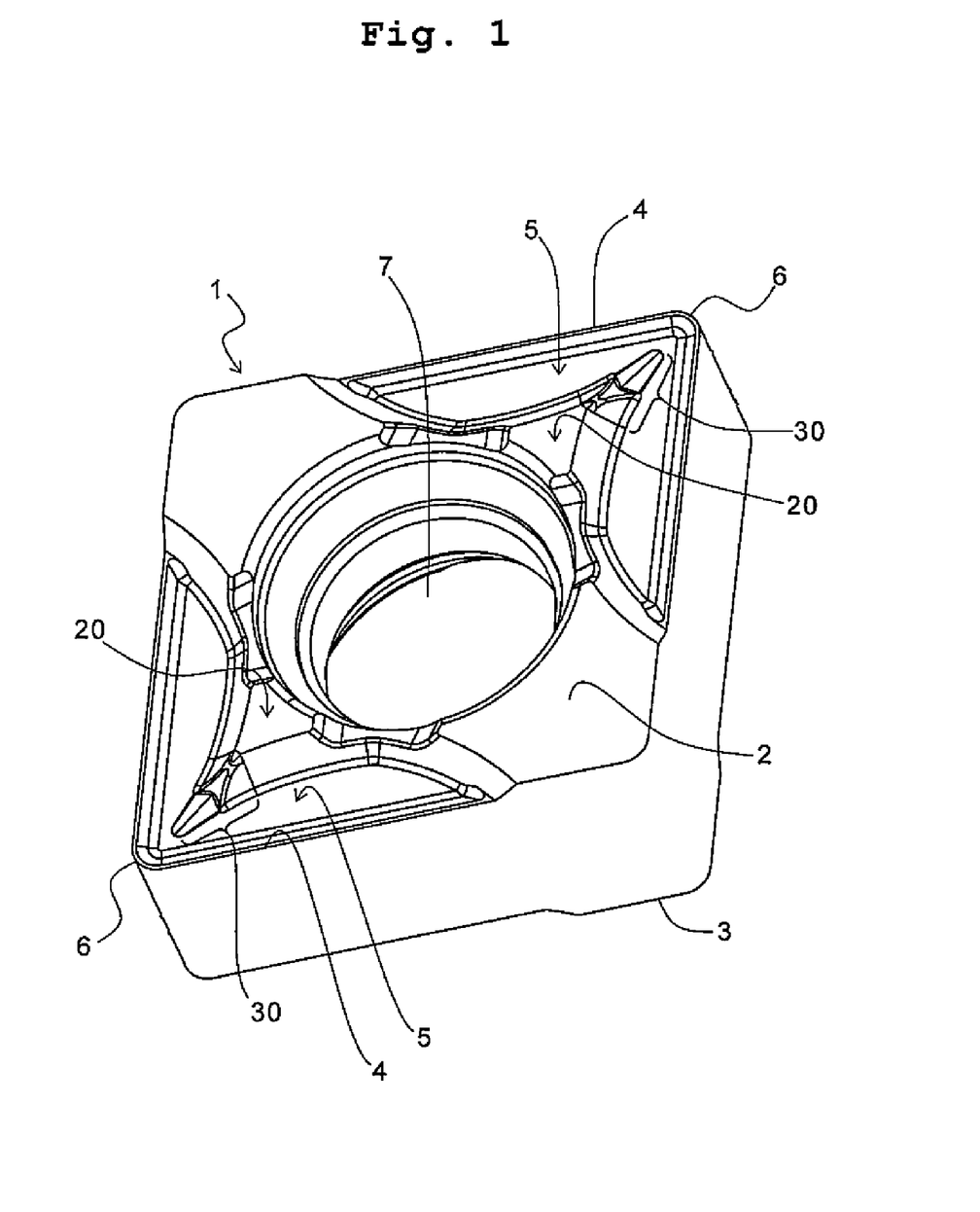
FIG. 1 is a perspective view showing a cutting insert according to an embodiment of the invention.
Figure 2:
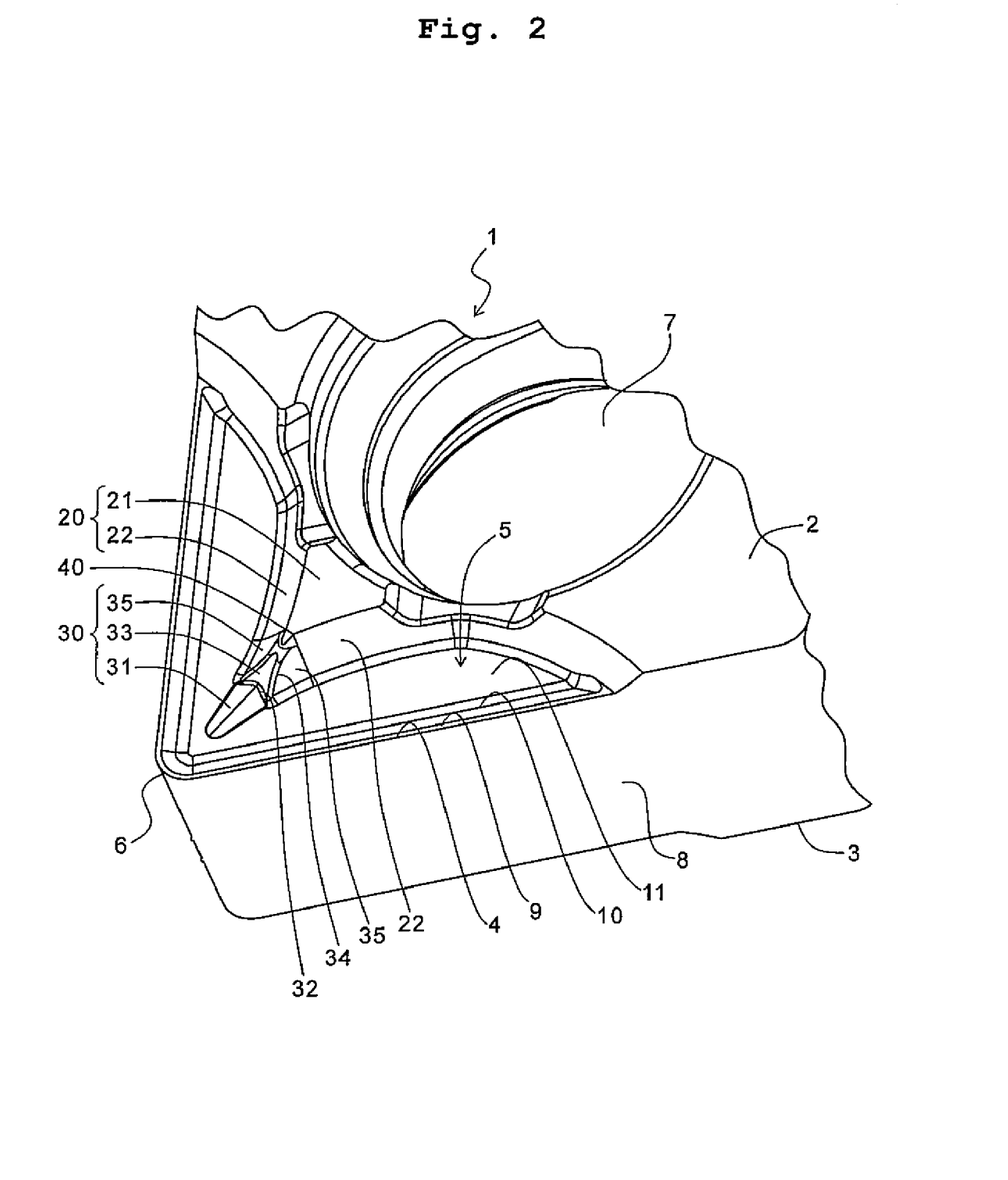
FIG. 2 is a partially enlarged perspective view showing the vicinity of a corner of the cutting insert according to the embodiment of the invention.
Figure 3:
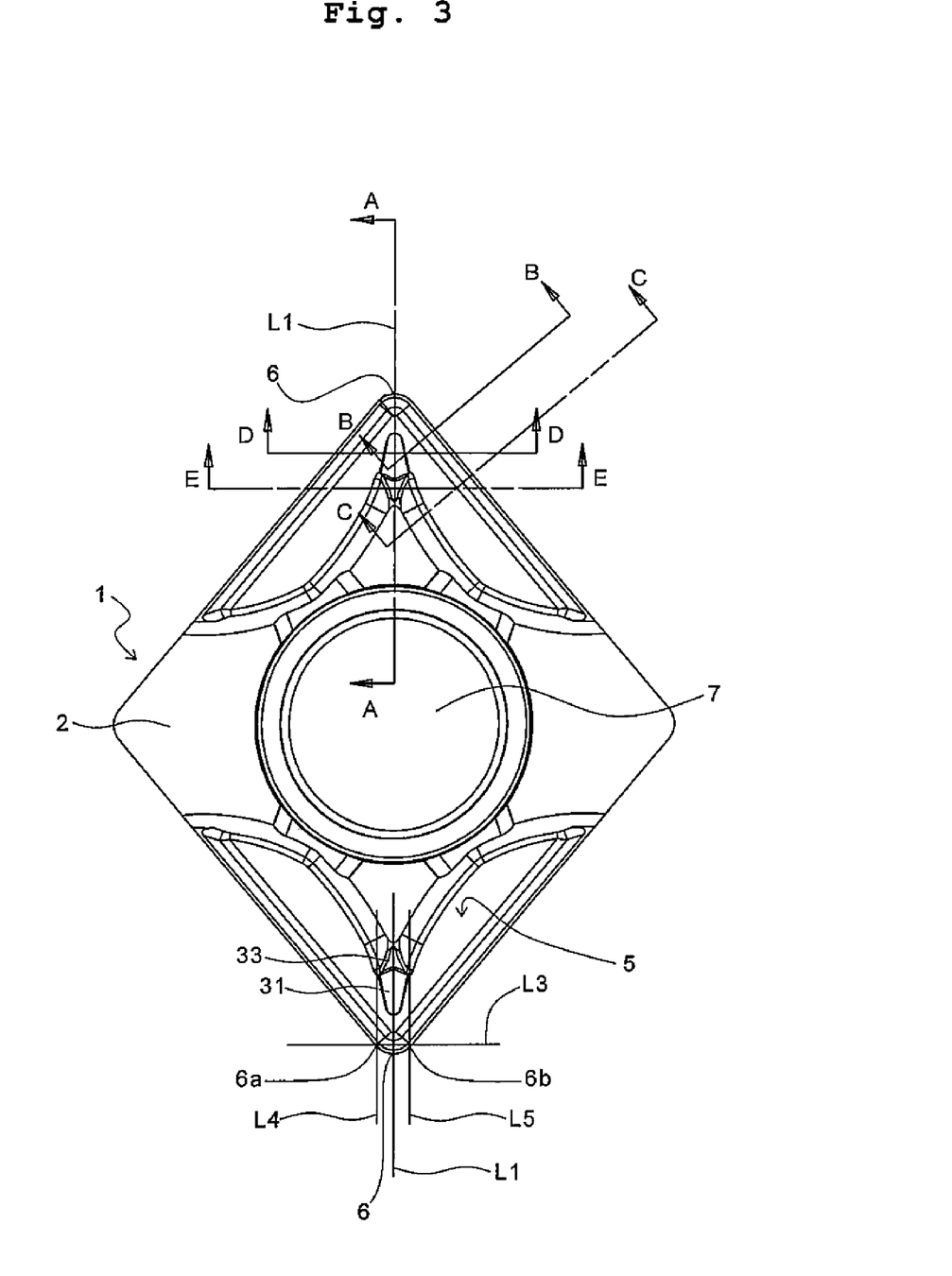
FIG. 3 is a plan view showing the cutting insert according to the embodiment of the invention.
Figure 4:
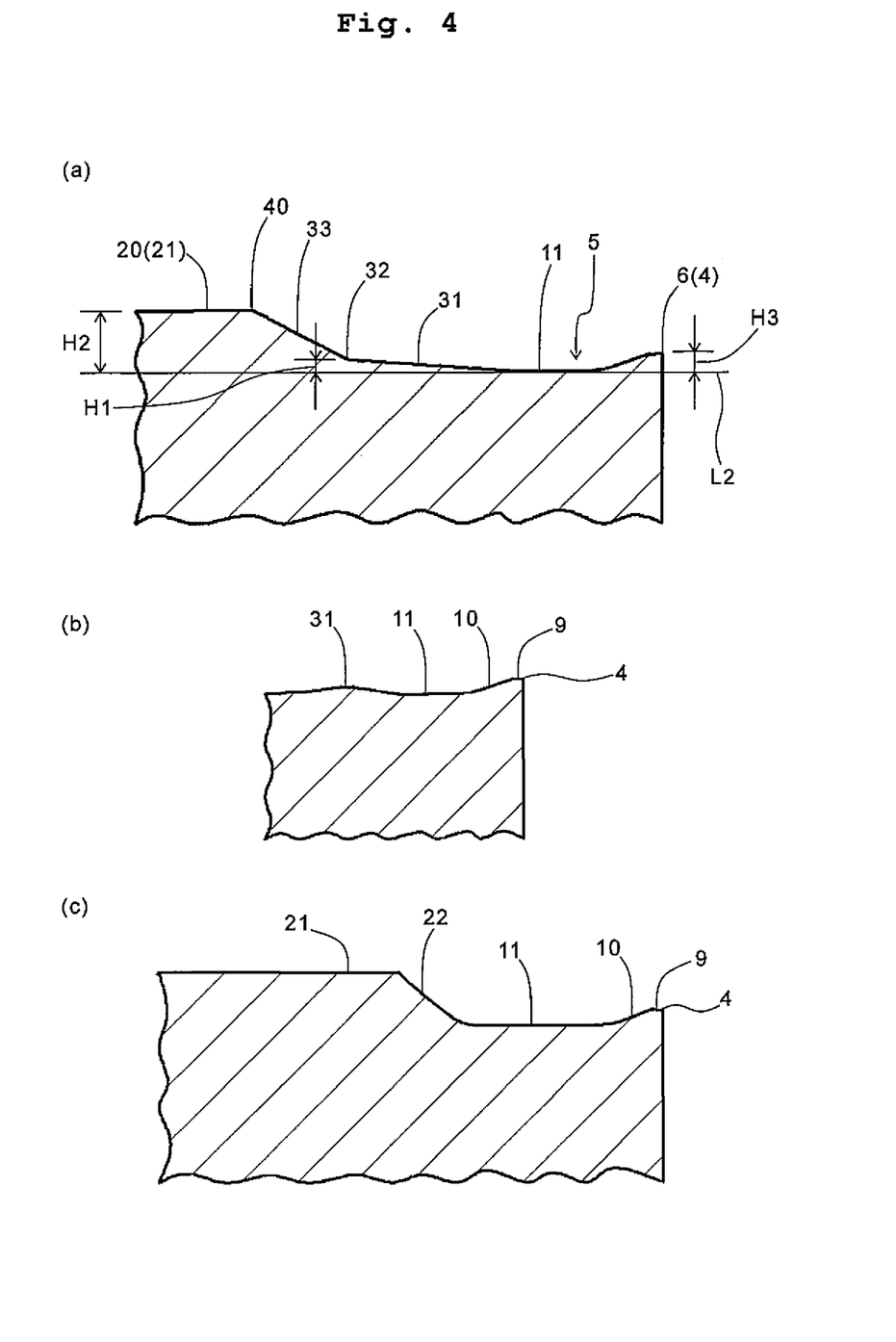
Figure 5:
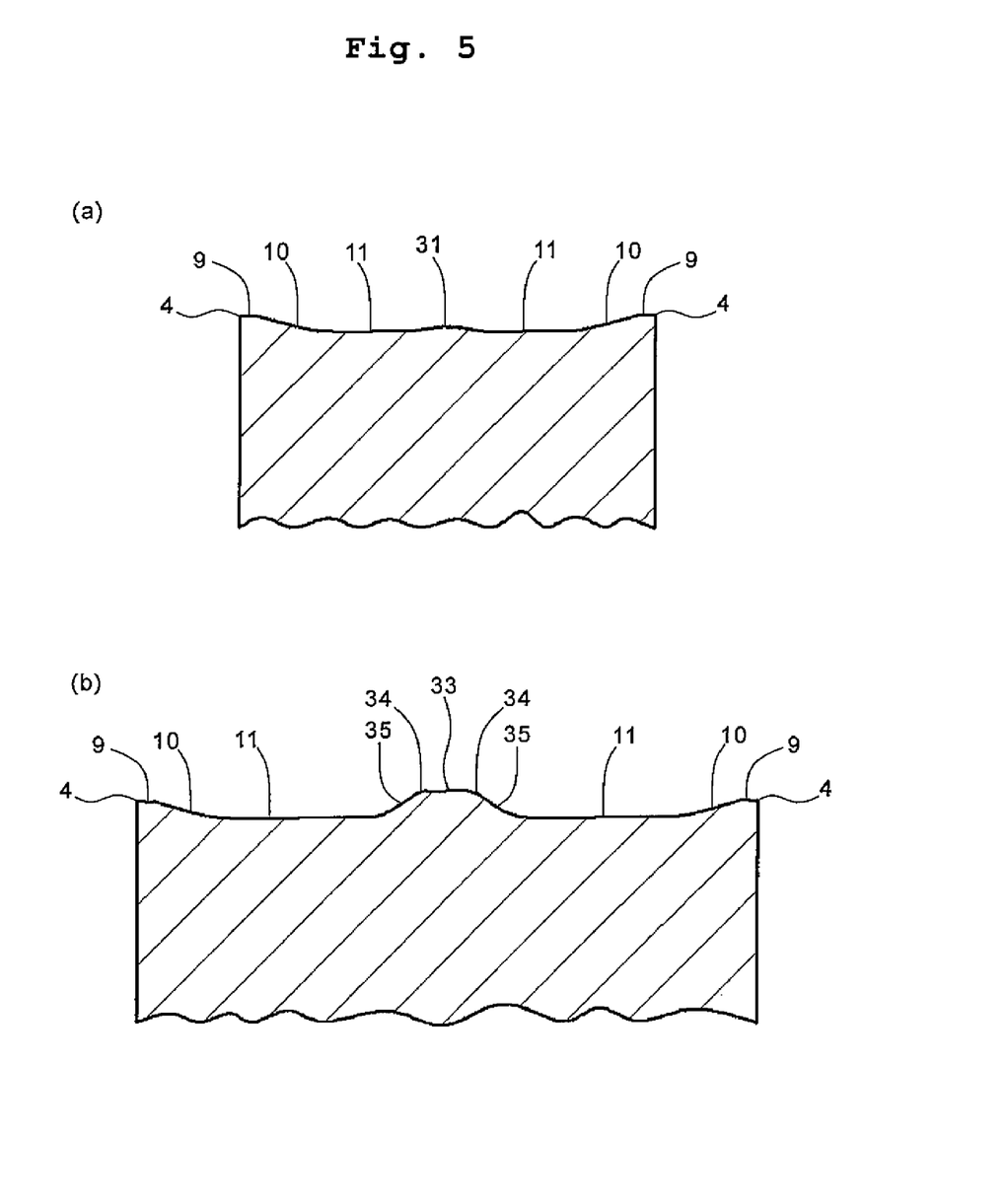

Height H1 of the breaker projection 31 is not more than half of the height of the connection part 40 between the breaker wall face 33 and the middle part 20, namely, height H2 of the top of the breaker wall face 33, and also lower than height H3 of the cutting edge 4 along the corner 6 (refer to FIG. 3 and FIG. 4(a)). The height H1 of the breaker projection 31 is determined with reference to a line L2 passing through the lowermost point of the breaker groove 5 and being parallel to the lower surface 3, in the vertical cross section with respect to the lower surface 3 including the bisector L1 of the corner 6. The term "the height H1 of the breaker projection 31" represents the maximum height in the height of the breaker projection 31 in a direction perpendicular to the line L2.

The breaker projection 31 thus formed is slightly higher than the breaker bottom face 11, thereby increasing the level difference between the breaker projection 31 and the breaker upper face 21. The insert 1 comprises at the level-difference portion the breaker wall face 33 comprising an inclined flat surface of a specific shape is disposed at, and the pair of breaker side faces 35 and 35 formed connectedly with the breaker wall face 33.

The insert 1 thus constructed is capable of coping with a wide range of cutting conditions (a) to (d) as shown in Table 1. That is, the insert 1 is capable of giving stable chip discharge performance because the breaker projection 31, the breaker wall face 33 (the inclined flat surface) and the breaker side faces 35 respectively function as a breaker, depending on the individual cutting conditions shown in Table 1.

As used herein, the term "functions as a breaker" denotes properly curling chips and discharging the chips in a suitable direction. In Table 1, the symbol "○" denotes functioning as a breaker, the symbol "Δ" denotes functioning as a breaker in some cases, and the symbol "-" denotes little or no function as a breaker.

| | Cutting conditions | Breaker projection 31 | Breaker wall face 33 | Breaker side face 35 |
|---|---|---|---|---|
| (a) | Depth of cut: small Feed rate: small | ○ | Δ | — |
| (b) | Depth of cut: small Feed rate: large | — | ○ | — |
| (c) | Depth of cut: medium | — | ○ | Δ |
| (d) | Depth of cut: large | — | — | ○ |

Specifically, when the depth of cut is small, at least one of the breaker projection 31 and the breaker wall face 33 functions as a breaker. That is, under the cutting conditions (a), the breaker projection 31 out of the breaker projection 31 and the breaker wall face 33 mainly functions as a breaker, and handles chips. Under the cutting conditions (b), the breaker wall face 33 functions as a breaker, and handles chips.

On the other hand, when the depth of cut is large, namely, under the cutting conditions (d), the breaker side face 35 functions as a breaker, and handles chips. When the depth of cut is larger than the depth of cut within which at least one of the breaker projection 31 and the breaker wall face 33 functions as a breaker, and smaller than the depth of cut within which the breaker side face 35 functions as a breaker, at least the breaker wall face 33 functions as a breaker. That is, under the cutting conditions (c), the breaker wall face 33 out of the breaker wall face 33 and the breaker side face 33 mainly functions as a breaker and handles chips.

Thus, by setting the height of the breaker projection 31 to be slightly higher than the breaker bottom face 11, the chips under the conditions where the depth of cut is small and the feed rate is small can be surely handled by the breaker projection 31 and the breaker wall face 33. Under the cutting conditions where the depth of cut is small and the feed rate is large, the generated chips smoothly run over the breaker projection 31 and are then handled by the breaker wall face 33. Under the conditions where the depth of cut is medium, chips can be stably handled by the breaker wall face 33 and the breaker side face 35. Under conditions where the depth of cut is large, chips can be handled by the breaker side face 35.

The term "when the depth of cut is small" means when the depth of cut is not greater than a corner R. The term "when the depth of cut is large" means when the depth of cut is not less than twice the corner R. The term "when the depth of cut is medium" means when the depth of cut is greater than the corner R and smaller than twice the corner R. The term "corner R" may represent "corner radius" described in JIS standards, and indicate the nominal radius of roundness of a round corner.

On the other hand, the corner 6 is formed in the shape of a substantially circular arc when viewed from above. Both ends 6a, 6b of the corner 6 (namely, the positions at which the circular arc is terminated) lie on a line L3 orthogonal to the bisector L1 of the corner 6 on the upper surface 2 (refer to FIG. 3). The breaker projection 31 and the breaker wall face 33 are formed in a region of the breaker groove 5 which lies between two lines L4 and L5 passing through both ends 6a and 6b of the corner 6, respectively, and being parallel to the bisector L1, when viewed from above. With the specific arrangement of the breaker projection 31 and the breaker wall face 33, the functions of the breaker projection 31 and the breaker wall face 33 as a breaker are optimized to give more excellent chip discharge performance.

Figure 6:
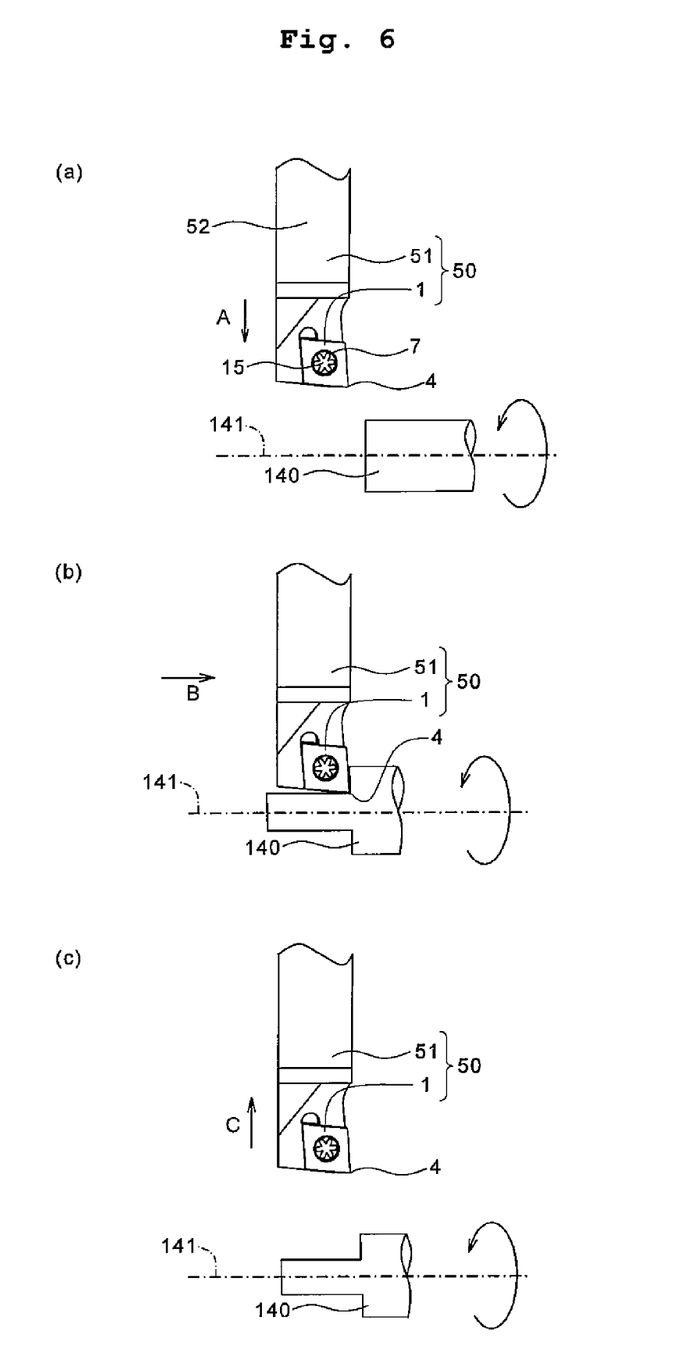

Next, a cutting tool with the insert 1 attached to the tip end of the holder, and a method of cutting a work material by using the cutting tool will be described with reference to FIGS. 6(a) to 6(c). As shown in FIG. 6(a), the cutting tool 50 according to the embodiment has the holder 51 and the insert 1 attached to the tip end of the holder 51.

An insert pocket (not shown) for attaching the insert 1 is formed in the tip end portion of the holder 51. The insert pocket comprises a bearing seat surface against which the lower surface 3 of the insert 1 abuts.

For attaching the insert 1 to the holder 51, firstly, a fixing screw 15 is inserted into the through-hole 7 of the insert 1. Subsequently, the tip of the fixing screw 15 is engaged with a screw hole formed in the bearing seat surface of the insert pocket in the holder 50, thereby attaching the insert 1 to the holder 51.

The cutting of a work material 140 by using the cutting tool 50 is carried out as follows. That is, firstly, as shown in FIG. 6(a), the work material 140 is rotated around an axis 141 of the work material 140. Subsequently, the cutting edge 4 of the insert 1 is brought near the work material 140 (in the direction indicated by arrow A in FIG. 6(a)). The cutting edge 4 and the work material 140 may be relatively close to each other. For example, the work material 140 may be brought near the cutting tool 50.

As shown in FIG. 6(b), the work material 140 is then cut by bringing the cutting edge 4 into contact with the surface of the work material 140 while feeding the holder 51 in the direction indicated by arrow B. At this time, the insert 1 has the above-mentioned specific construction, thereby giving stable chip discharge performance in the range of the above cutting conditions (a) to (d). It is therefore capable of reducing damage to the machined wall due to chips. Consequently, machining accuracy is improved.

Thereafter, as shown in FIG. 6(c), the cutting tool 50 is separated from the work material 140 in the direction indicated by arrow C. The work material 140 and the cutting tool 50 may be relatively away from each other. For example, the work material 140 may be moved away from the cutting tool 50. When the cutting is continued, the step of bringing the cutting edge 4 of the cutting tool 50 into contact with different points of the work material 140 may be repeated, keeping the work material 140 rotating. When the cutting edge 4 in use is worn, an unused cutting edge 4 may be used by turning the insert 1 180 degrees around the central axis of the through-hole 7.

Figure 7:
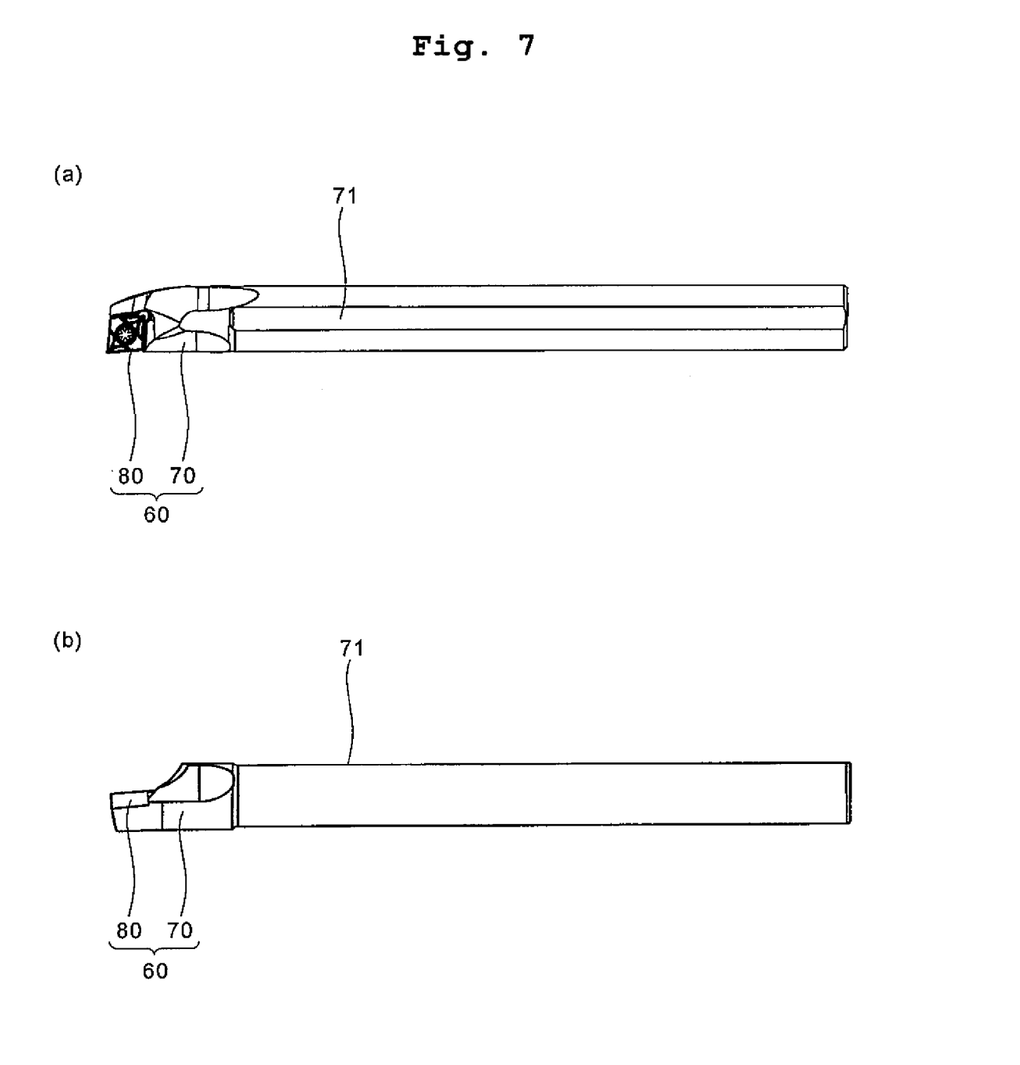

Other embodiment of the cutting tool of the invention will be described below with reference to FIGS. 7(a) and 7(b). As shown in FIGS. 7(a) and 7(b), the cutting tool 60 of this embodiment comprises a holder 70, and an insert 80 attached to the tip end of the holder 70.

The insert 80 has the same construction as the insert 1 according to the foregoing embodiment except that a line passing through the lowermost point of the breaker groove and being parallel to a reference surface 71 of the holder 70 is employed as a reference line that determines the height of the breaker projection.

That is, in the vertical cross section with respect to the lower surface including the bisector of the corner, the height of the breaker projection in the insert 80 is not more than half the height of the top of the breaker wall face and lower than the height of the cutting edge along the corner, with reference to the line passing through the lowermost point of the breaker groove and being parallel to the reference surface 71 of the holder 70.

Therefore, with the insert 80 attached to the holder 51, the insert 80 has the same construction as the insert 1 of the foregoing embodiment. The term "the reference surface 71 of the holder 70" means a surface as a basis for mounting the holder 70 on an external equipment.

More specifically, in the foregoing embodiment, the bearing seat surface of the insert pocket of the holder 51 is disposed substantially parallel to the reference surface (not shown). Accordingly, the lower surface 3 of the insert 1 attached to the insert pocket is substantially parallel to the reference surface of the holder 70.

On the other hand, as shown in FIG. 7(b), in this embodiment, the bearing seat surface of the insert pocket of the holder 51 is disposed inclined to the reference surface 71. Accordingly, the lower surface of the insert 80 attached to the insert pocket is inclined to the reference surface 71 of the holder 70.

This embodiment has the above construction that defines the relationship between the protruded portion and the cutting edge in the tool in which the lower surface of the insert 80 is thus inclined to the reference surface 71 of the holder 70. Even if the insert itself does not have the construction according to the foregoing embodiment, excellent chip discharge performance can be achieved over a wide range of cutting conditions by having the foregoing construction in the state that the insert is attached to the holder. Other constructions are similar to that described in the cutting tool 50 according to the foregoing embodiment.

For example, in the cutting tool 50 of the foregoing embodiment, the holder 51 comprises a reference surface 52 (refer to FIG. 6(a)). Therefore, the insert 1 of the foregoing embodiment may be replaced with an insert with a breaker projection having a specific height with reference to a line passing through the lowermost point of the breaker groove and being parallel to the reference surface 52 of the holder 50.

Figure 8:
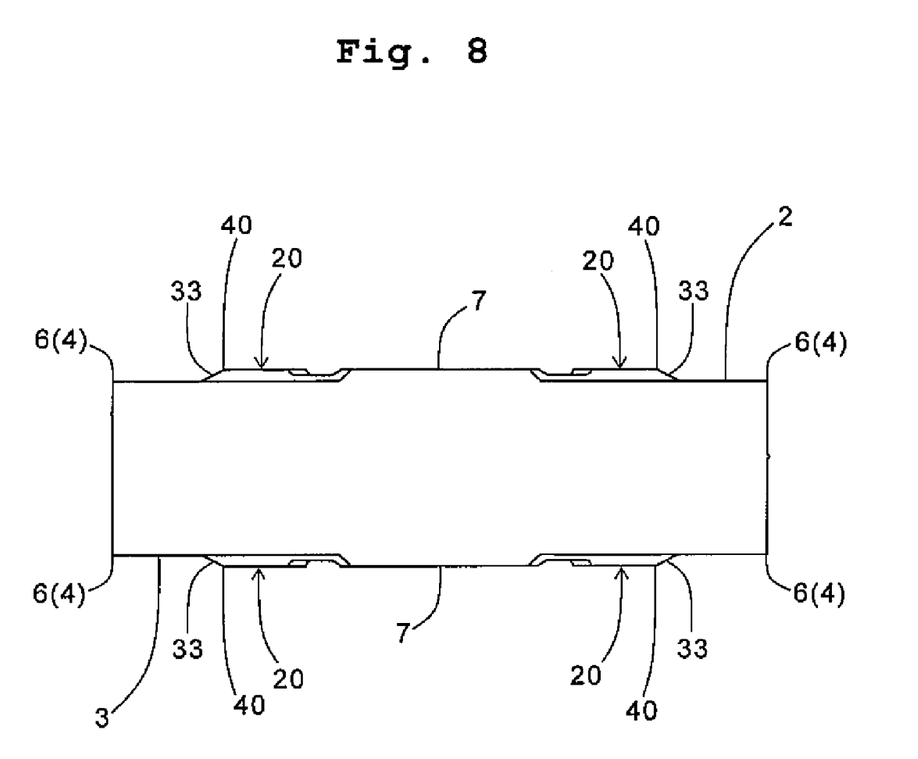
FIG. 8 is a side view showing a cutting insert according to other embodiment of the invention.

While the several embodiments of the present invention have been described and illustrated above, it is to be understood that the present invention is not limited thereto and applicable to those in which changes and improvements are made thereto without departing from the spirit or scope of the present invention. For example, though in the foregoing embodiment, only the construction of the upper surface 2 of the insert 1 has been described, as shown in FIG. 8, the lower surface 3 may be provided with the same construction as the upper surface 2. Similarly, though in the foregoing embodiment, the cutting edge, the breaker groove, the inclined side surface and the breaker side face are formed on both of the first side and the second side on the upper surface, these may be formed, for example, only on the first side.

Although the foregoing embodiment has described the insert 1 having the substantially parallelogram shape when viewed from above, the shape of the insert of the invention is not limited thereto, and it may have a polygonal shape such as a substantially triangular shape or a substantially pentagonal shape.

The shape of the breaker projection is not limited to that of the breaker projection 31 made up of the two plan surfaces having the intersecting ridge on the bisector L1 of the corner 6. For example, it may be an upwardly projected curved-surface (a projected curved-surface), or other shape.

The connection part 40 between the breaker wall face 33 and the middle part 20 may be filleted. Consequently, chips generated smoothly run over the connection part 40.

For attaching the insert to the holder, the clamp method in which the insert 1 is screwed into the holder 51 has been described. Alternatively, clamp-on method, lever lock method, or the like may be employed.

Although external turning, specifically traversing has been described as a cutting method, the insert and the cutting tool according to the present invention are also suitably applicable to other cuttings such as internal turning and the like, besides the outer diameter machining.

The invention claimed is:

1. A cutting insert comprising:
a body comprising an upper surface comprising a corner and a first side and a second side disposed on both sides of the corner, and a lower surface corresponding to the upper surface,
a cutting edge disposed along the corner and the first side;
a breaker groove disposed along the corner and the first side on the upper surface and lying inside of the cutting edge;
a protruded portion disposed corresponding to the corner on the upper surface and lying more inward than the breaker groove; and
an inclined side surface disposed along the first side on the upper surface and lying more inward than the breaker groove,
the protruded portion comprising:
a breaker projection adjucent to the corner;
a breaker wall face lying more inward than the breaker projection and connected with the breaker projection so as to project more upward than the breaker projection; and
a breaker side face connected with the breaker wall face and formed disposed along the first side,
wherein
the breaker wall face has a first width on a lower end thereof and a second width on a upper end thereof, wherein the second width is smaller than the first width, and is disposed corresponding to the corner as to be passed through by a bisector of the corner when viewed from above, and inclined to have a higher position as it departs from the corner in a vertical cross section with respect to the lower surface including the bisector of the corner,
the breaker side face is connected with the inclined side surface, and has a third width on a first end near the corner and a forth width on a second end near the inclined side surface, wherein the forth width is larger than the third with and
in the vertical cross section with respect to the lower surface including the bisector of the corner, the height of the breaker projection with respect to a reference line passing through the lowermost point of the breaker groove and being parallel to the lower surface is not more than half of the height of the top of the breaker wall face and lower than the height of the cutting edge along the corner.

2. The cutting insert according to claim 1 wherein the breaker side face comprises a recessed curved surface, and the inclined side surface comprises a recessed curved surface.

3. The cutting insert according to claim 1 wherein a connection part between the breaker wall face and the breaker side face is filleted.

4. The cutting insert according to claim 1 wherein,
both ends of the corner lie on a line orthogonal to the bisector when viewed from above,
the breaker grooves has a tip region lying between two lines, the two lines passing through both ends of the corner, respectively, and being parallel to the bisector, when viewed from above, and the breaker projection and the breaker wall face are disposed in the tip region.

5. The cutting insert according to claim 1 wherein the breaker projection comprises two flat surfaces having an intersecting ridge on the bisector, or a projected curved surface.

6. A cutting tool comprising a holder, and the cutting insert according to claim 1 attached to a tip end of the holder.

7. A cutting tool comprising a holder, and a cutting insert attached to a tip end of the holder,
the cutting insert comprising:
an upper surface having a corner and a first side and a second side disposed on both sides of the corner;
a lower surface corresponding to the upper surface;
a cutting edge along the corner and the first side;
a breaker groove disposed along the corner and the first side on the upper surface and lying inside of the cutting edge;
a protruded portion disposed corresponding to the corner on the upper surface nad lying more inward than the breaker groove; and
an inclined side surface disposed along the first side on the upper surface and lying more inward than the breaker groove,
the protruded portion comprising:
a breaker projection adjacent to the corner;
a breaker wall face lying more inward than the breaker projection and connected with the breaker projection so as to project more upward than the breaker projection; and
a breaker side face connected with the breaker wall face and disposed along the first side,
wherein
the breaker wall face has a first width on a lower end thereof and a second width on a upper end thereof, wherein the second width is smaller than the first width, and is divided into two by a bisector of the corner when viewed from above, and inclined to have a higher position as it departs from the corner in a vertical cross section with respect to the lower surface including the bisector of the corner,
the breaker side face is connected with the inclined side surface, and has a third width on a first end near the corner and a forth width on a second end near the inclined side surface, wherein the forth width is larger than the third width and
in the vertical cross section with respect to the lower surface including the bisector of the corner, the height of the breaker projection with respect to a reference line passing through the lowermost point of the breaker groove and being parallel to the lower surface is not more than half of the height of the top of the breaker wall face and lower than the height of the cutting edge along the corner.

8. A method of cutting a work material by using the cutting tool according to claim 6, comprising:
relatively bringing the cutting tool near the work material;
cutting a surface of the work material by rotating the work material and bringing the cutting edge into contact with the surface of the work material; and
relatively separating the work material and the cutting tool.

9. The cutting insert according to claim 1 wherein the width of the breaker wall face gets smaller as it goes upward.

10. The cutting insert according to claim 1 wherein the width of the breaker side face gets a larger as it departs from the corner along the first side.

11. The cutting insert according to claim 1 wherein the breaker groove comprises a first face having a flat surface and disposed between the breaker projection and the corner.

12. The insert according to claim 11 wherein the first face is extended along the first side.

13. The cutting insert according to claim 1 wherein the inclined side surface is extended far from the bisector of the corner as it departs from the corner.

14. The cutting insert according to claim 1 wherein the breaker wall face consists of one surface.

15. The cutting insert according to claim 14 wherein the breaker wall face consists of one substantially plane surface.

16. The cutting insert according to claim 14 wherein the breaker wall face has a substantially symmetrical shape with respect to the bisector of the corner when viewed from above.

17. The cutting insert according to claim 1 wherein a connection part between the breaker wall face and the breaker side face has a upwardly projected curved shape.

18. The cutting insert according to claim 1 wherein the width of the protruded portion gets larger as it departs from the corner when viewed from above.

* * * * *